(12) United States Patent
van Nieuwstadt (10) Patent No.: US 6,546,720 B2
(45) Date of Patent: Apr. 15, 2003

(54) METHOD AND APPARATUS FOR CONTROLLING THE AMOUNT OF REACTANT TO BE ADDED TO A SUBSTANCE USING A SENSOR WHICH IS RESPONSIVE TO BOTH THE REACTANT AND THE SUBSTANCE

(75) Inventor: Michiel Jacques van Nieuwstadt, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,445

(22) Filed: Sep. 4, 2001

(65) Prior Publication Data

US 2003/0046928 A1 Mar. 13, 2003

(51) Int. Cl.$^7$ ................................................. F01N 3/00
(52) U.S. Cl. .............................. 60/286; 60/274; 60/276; 60/285; 60/303; 73/118.1
(58) Field of Search .......................... 60/274, 276, 277, 60/285, 286, 303; 73/118.1

(56) References Cited

U.S. PATENT DOCUMENTS

| | | |
|---|---|---|
| 5,369,956 A | 12/1994 | Daudel et al. |
| 5,410,873 A | 5/1995 | Tashiro |
| 5,540,047 A | 7/1996 | Dahlheim et al. |
| 5,628,186 A | 5/1997 | Schmelz |
| 5,643,536 A | 7/1997 | Schmelz |
| 5,831,145 A | 11/1998 | Logothetis et al. |
| 5,842,341 A | 12/1998 | Kibe |
| 5,845,487 A | 12/1998 | Fraenkle et al. |
| 5,941,067 A | 8/1999 | Hirota et al. |
| 5,950,422 A | 9/1999 | Dolling |
| 6,001,318 A | 12/1999 | Tillaart et al. |
| 6,016,653 A | 1/2000 | Glassey et al. |
| 6,017,503 A | 1/2000 | Kato et al. |
| 6,079,203 A | 6/2000 | Wakamoto |
| 6,082,102 A * | 7/2000 | Wissler et al. ................ 60/286 |
| 6,119,448 A | 9/2000 | Emmerling et al. |
| 6,134,883 A | 10/2000 | Kato et al. |
| 6,199,374 B1 * | 3/2001 | Hirota et al. ................ 60/277 |
| 6,216,451 B1 * | 4/2001 | Schnaibel et al. ............ 60/277 |

* cited by examiner

Primary Examiner—Thomas Denion
Assistant Examiner—Binh Tran
(74) Attorney, Agent, or Firm—Allan J. Lippa; John D. Russell (57) ABSTRACT

A method wherein a reactant is added to a substance to react with such substance. The product of such reaction along with un-reacted portions of the substance and un-reacted portions of the reactant are directed to a sensor. The sensor produces an output signal in response to detection of both the un-reacted portions of the substance and the un-reacted portions of the reactant. The method includes changing the amount of reactant added to the substance. A measurement is made to determine whether the change in the amount of reactant and the change the output signal are in the same direction or in opposite directions. A processor is provided for controlling the addition of a reactant to a substance to react with such substance. The product of such reaction along with un-reacted portions of the substance and un-reacted portions of the reactant are directed to a sensor. The sensor produces an output signal in response to detection of both the un-reacted portions of the substance and the un-reacted portions of the reactant. The processor changes the amount of reactant added to the substance; such processor being programmed to: determine whether the change in the amount of reactant and the change the output signal are in the same direction or in opposite directions. With such arrangement, the processor uses the product of the change in reactant and output signal to correct the nominal urea:NOx ratio.

6 Claims, 7 Drawing Sheets

FIG. 5 pertinent traces for active excitation algorithm. K_base = 0.7

METHOD AND APPARATUS FOR CONTROLLING THE AMOUNT OF REACTANT TO BE ADDED TO A SUBSTANCE USING A SENSOR WHICH IS RESPONSIVE TO BOTH THE REACTANT AND THE SUBSTANCE

BACKGROUND OF INVENTION

This invention relates generally to methods and apparatus for controlling the amount of reactant to be added to a substance to reduce such substance. More particularly the invention relates to methods and apparatus for reducing NOx with urea using a using a sensor which is responsive to un-reacted portions of the NOx and un-reacted portions of the urea.

As is known in the art, in many applications it is desirable to detect the effectiveness of a reaction used to reduce a substance. One such application is in measuring the effectiveness in urea based selective catalytic reduction (SCR) in reducing nitrogen (NOx) in the exhaust gas of a diesel engine. More particularly, an aqueous solution of urea is injected into the exhaust gas of the engine upstream of a catalyst. In order for the method to reduce NOx in the exhaust effectively, it is important that the amount of urea injected into the exhaust be accurately controlled. Injection of too little urea may result in sub-optimal (i.e., incomplete) NOx conversion. Injection of too much urea may produce nitrates in the exhaust which can reduce the life of the exhaust system downstream of the catalyst, may produce an unpleasant odor, and may also produce increases in regulated emissions.

Thus, it is desirable to have a sensor downstream of the catalyst which can detect the presence of NOx after the reaction. Unfortunately, currently available sensors which are practical for automotive use from cost and size perspectives cannot differentiate between NOx and urea. It has also been suggested that a sensor be placed upstream of the both the catalyst and the injected urea. Thus, with such an arrangement, the sensor would not be exposed to the urea and would only be responsive to the NOx in the engine exhaust. With this arrangement, however, a priori knowledge of the amount of urea to be injected into the engine exhaust for a measured amount of pre-reacted NOx is assumed. Thus, if the sensor produces a signal, nox1, for the urea injector, the correct amount of urea to be added is k_base*nox1, where k_base is an a priori determined factor. The factor k_base may be a function of several variables, such as engine speed and load etc. Thus, values of the factor k_base as a function of these variables may be stored in a look-up table. During operation, these variables are measured and are fed to the look-up table to provide the factor k_base. This arrangement, however, assumes that the factor k_base will not change with age, that the injector which is responsive to the signal, k_base*nox1, has a known, time invariant transfer function, k_injector, and that the catalyst is operating properly. Thus, this is a feed-forward control system.

In order to account for such variables as age, changes in k_injector, and catalyst efficiency variations, a feed-back loop control system which responds to the actual amount of NOx produced after the catalyst would be desirable. Unfortunately, as noted above, practical automotive NOx sensors are responsive to both NOx and urea.

As will be described in detail below, a detection method is disclosed which enables differentiation between the presence of urea and NOx by a sensor which is itself unable to differentiate between urea and NOx and to provide therefrom a control signal to optimize the injection of the reactant into the substance.

SUMMARY OF INVENTION

In accordance with the invention, a method is provided for controlling an amount of a first substance to be added to a reaction with at least a second substance of the reaction. The method is used to reduce the first substances of the reaction. The product of such reaction along with un-reacted portions of the substances are directed to a sensor. The sensor producing an output signal in response to detection of un-reacted portions of the first substance and un-reacted portions of the second substance. The method includes changing the amount of the first substance added to the reaction. The output signal is measured to determine whether such output signal increases or decreases with the changed amount of the first substance. From such measurement, a determination is made whether the sensor is responding to the un-reacted portions of the first substance or to the un-reacted portions of the second substance. The amount of the first substance to the reaction is adjusted in accordance with the determination.

In accordance with one embodiment, a method is provided for controlling an amount of a reactant used to reduce a substance added to such substance to react with such substance. The product of the reaction along with un-reacted portions of the substance and un-reacted portions of the reactant are directed to a sensor. The sensor produces an output signal in response to detection of both the un-reacted portions substance and the un-reacted portions of the reactant. The method includes changing the amount of reactant added to the substance in accordance with a measurement made to determine whether the output signal increases or decreases with the changed amount of reactant. More particularly, from such measurement, a determination is made whether the sensor is responding to the un-reacted reactant or to the un-reacted substance and the amount of the reactant added to the substance is adjusted in accordance with the determination.

In accordance with one embodiment, the reactant is urea and the substance is NOx.

Thus, with such an arrangement, a NOx, urea-nonselective, sensor may be placed downstream of the catalyst. Consequently, adjustments in the urea may be made because of aging effects and changing ambient conditions. Thus, the amount of NOx actually produced may deviate from the predicted quantity. To put it another way, a system which merely measures engine speed and load, gas temperature, and rate of acceleration etc. to make an open-loop determination of the amount of urea to be added to the engine exhaust may not adequately compensate for the aging effects and changing ambient conditions. Here, with the sensor and processing method, these deviations from any open-loop predicated amount will automatically be compensated in a feedback arrangement which properly controls the amount of urea to be injected to provide stoichiometry.

In accordance with one feature of the invention, a method is provided for controlling an amount of a reactant used to reduce a substance added to such substance to react with such substance. The product of such reaction along with un-reacted portions of the substance and un-reacted portions of the reactant are directed to a sensor. The sensor produces an output signal in response to detection of both the un-reacted portions substance and the un-reacted portions of the reactant. The method includes periodically increasing and decreasing the amount of reactant added into the substance. Changes in the output signal produced by the sensor are caused by such periodical increases and decreases. The method includes integrating over each period a mathematical product of the periodically increasing and decreasing the amount of reactant with the measured change in output signal to produce a control signal. The amount of the reactant added to the substance is adjusted in accordance with the control signal.

In accordance with another feature of the invention, a processor is provided for controlling the addition of a reactant to a substance to react with such substance. The product of such reaction along with un-reacted portions of the substance and un-reacted portions of the reactant are directed to a sensor. The sensor produces an output signal in response to detection of both the un-reacted portions of the substance and the un-reacted portions of the reactant. The processor changes the amount of reactant added into the substance in accordance with a program to enable the processor to determine whether the change in the amount of reactant and the change the output signal are in the same direction or in opposite directions.

In accordance with one embodiment, the processor is programmed to: (a) periodically increase and decrease the amount of reactant added to the substance; (b) measure changes in the output signal produced by the sensor from such periodical increases and decreases; (c) integrate over each period a mathematical product of the periodically increasing and decreasing the amount of reactant with the measured change in output signal to produce a control signal, and (d) adjust the amount of the reactant added to the substance in accordance with the determination. The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
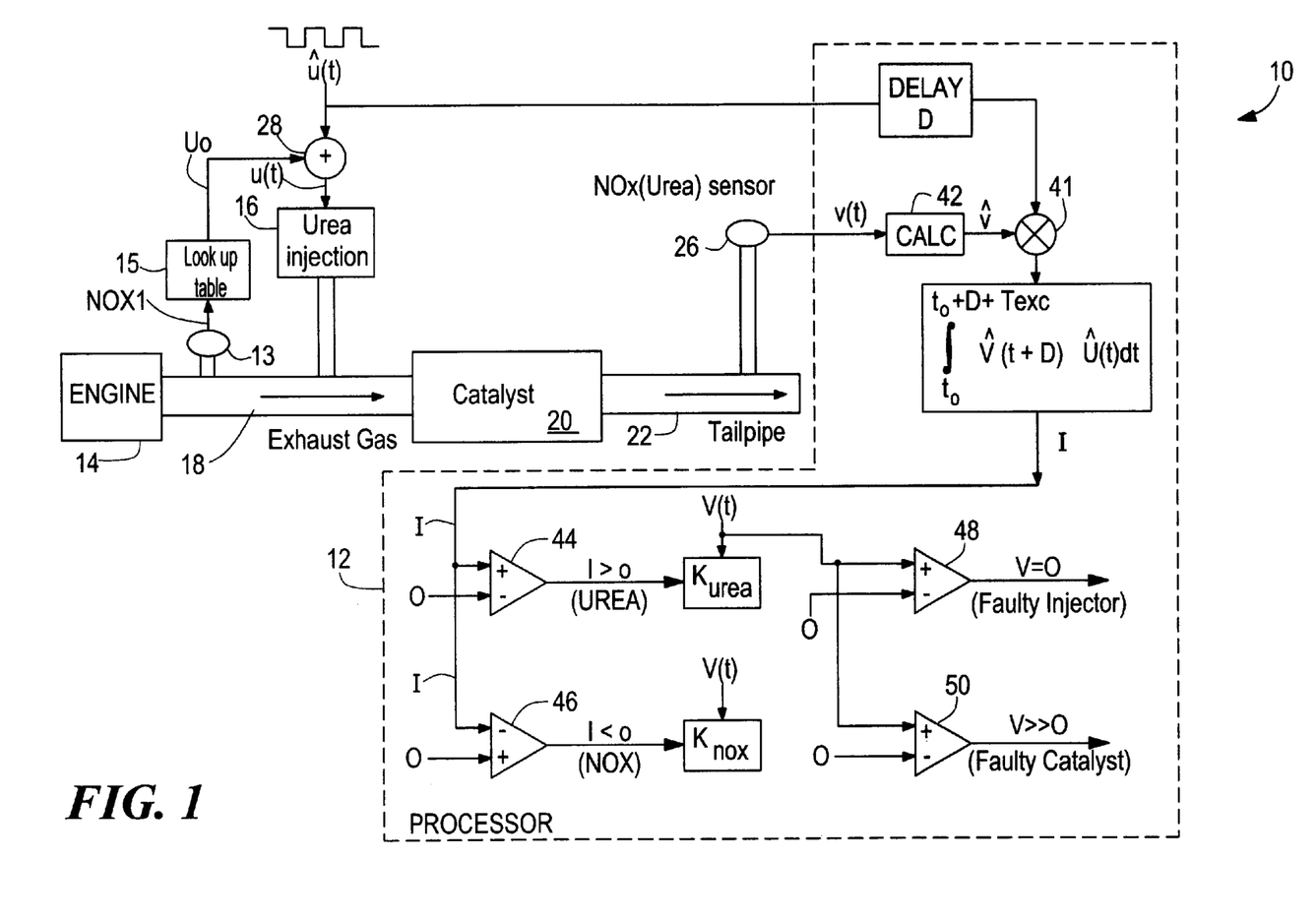
FIG. 1 is a diagrammatical sketch of an engine exhaust system according to the invention having a processor programmed for determining the effectiveness of injected urea in reducing NOx produced by the engine.

Referring now to FIG. 1, is a diagrammatical sketch of an engine exhaust system is shown having a processor 12 programmed for determining the effectiveness of injected urea in reducing $NO_x$ produced by an engine 14. The system 10 includes a reactant injector 16, here a urea injector, adapted to inject urea into the exhaust 18 of the engine in response to an excitation signal u(t), where t is time. The injection signal u(t) is made up of two components: a nominal level $u_0$ and a changeable component û(t). The nominal level $u_0$ may be produced by providing a sensor 13 in the engine exhaust upstream of the injection of the urea. Thus, here $u_0$=k_base*NOx1, where NOx1 is the signal produced by this upstream sensor and k_base is a conversion factor stored in a look-up table 15 relating the a priori assumed stoichiometric amount of urea needed to convert the NOx in the upstream engine exhaust.

The exhaust 18, together with the injected urea, is directed to a catalyst 20 though the engine's exhaust pipe. The catalyst 20 is used to facilitate the reaction between the NOx and the urea. The injected urea reacts with NOx which may be present in the exhaust 18 in the catalyst 20 to produce a product 22 which includes the reaction products as well as any un-reacted portions of the injected urea or un-reacted portions of the NOx.

As will be described, the processor 12 is also programmed to determine whether the injector 16 is faulty and whether the catalyst 20 is faulty.

Figure 2:
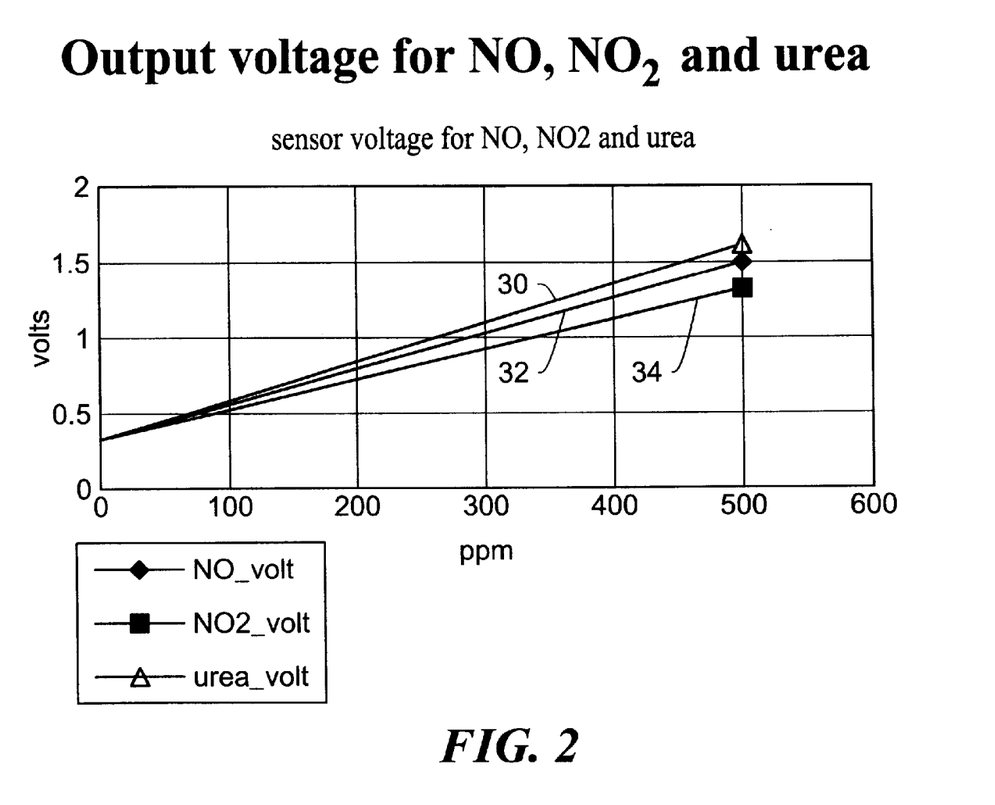
FIG. 2 is a diagram showing the relationship between an output signal produced by a sensor used in the exhaust system of FIG. 1 as a function of either nitrogen monoxide (NO), nitrogen dioxide ($NO_2$) or urea.

More particularly, the output of the catalyst 22 is sensed by a second NOx sensor 26. While it would be desirable that the sensor 26 sense only the presence of any NOx at the output of the catalyst, current practical automotive NOx sensors, as noted above, produce an output signal in response to NOx and urea. Thus, these sensors cannot differentiate between NOx and urea. That is, the sensor 26 is a non-selective NOx sensor. This is illustrated from FIG. 2. Curve 30 shows the relationship, i.e., transfer function, between sensor 26 output signal (V, volts) and measured urea in the presence of only urea. It is noted that the slope of curve 60 is here k_urea. Curve 32 shows the relationship, i.e., transfer function, between sensor 26 output signal (V, volts) and measured NO in the presence of only NO. It is noted that the slope of curve 60 is here k_no Curve 34 shows the relationship, i.e., transfer function, between sensor 26 output signal (V, volts) and measured $NO_2$ in the presence of only $NO_2$. It is noted that the slope of curve 60 is here k_no2. (It is noted that the response of the sensor to NOx is interpolated from the responses to NO and NO2. For example a 50-50 mixture of NO and NO2 would result in the slope (k_no+k_no2)/2. The family of interpolated slopes is collectively referred to as k_nox.

The method described herein enables differentiation between NOx and urea detection using theses practical NOx non-selective sensors. More particularly, a urea excitation technique to be described allows one to determine whether the non-selective sensor 26 is responding to NOx or to urea. According to the method, the amount of urea injected into the engine exhaust 18 is modulated, or changed in a particular, a priori known direction, or sense. The output of the non-selective NOx sensor 26 is processed by processor 12 along with knowledge of the direction in the change in the amount of injected urea. The result of the processing yields an indication of whether the sensor is sensing urea or NOx by determining whether the change in urea injection and the change in sensor 26 output signal are in the same direction or in opposite directions.

Figure 3:
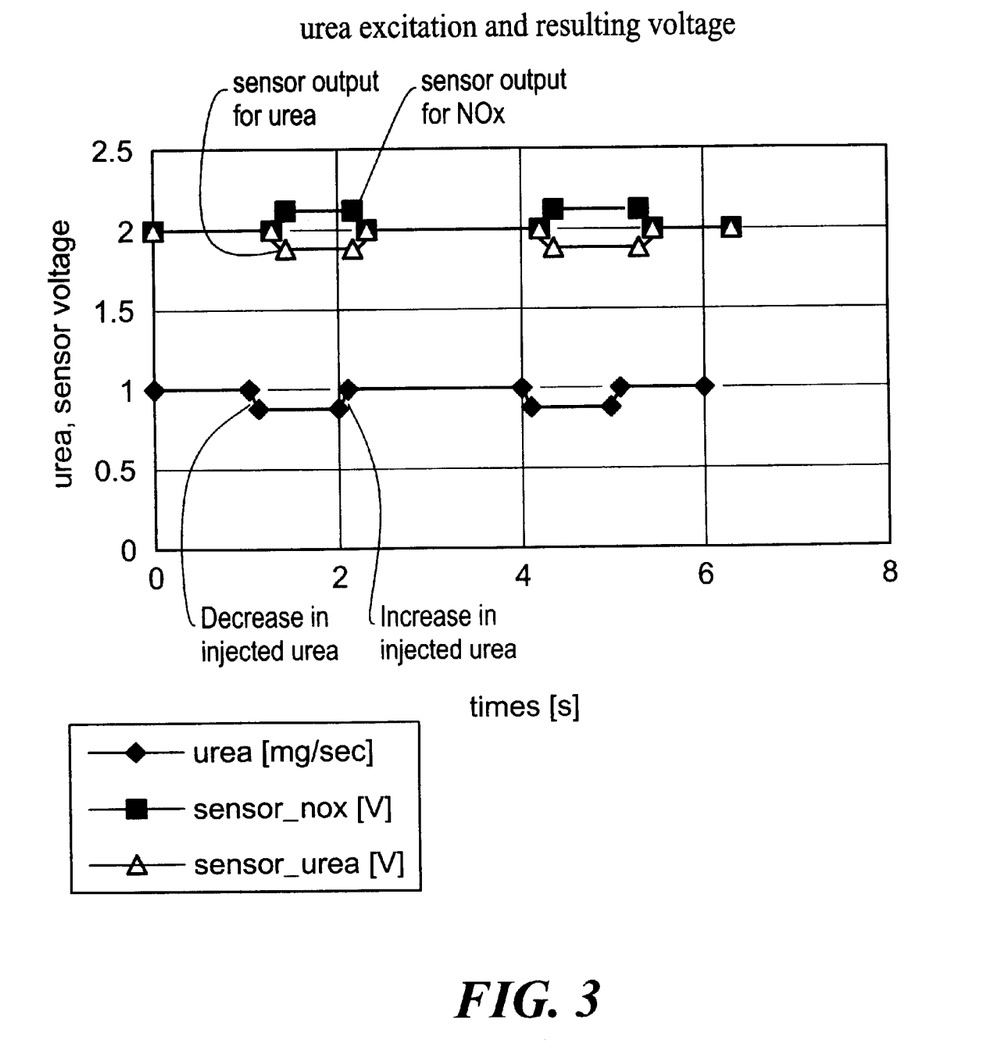
FIG. 3 is a diagram showing the output signal produced by the sensor used in the exhaust system of FIG. 1 in response to increases and decreases in the amount of urea injected into the engine exhaust in the system of FIG. 1.

Here, in the system shown in FIG. 1, a small, periodic negative amplitude excitation signal û(t) of duration Texc is superimposed on the excitation signal $u_0$ in a summer 28. The summer 28 produces u(t) which provides the excitation signal for the injector urea injector 16. Since during these negative excursions in the excitation signal u(t) the amount of urea is reduced, less NOx is being reduced, if any. If the sensor 26 output signal, here a voltage V(t), goes lower in response to the negative excursion in the excitation signal u(t), too much urea is being injected into the exhaust 18 and the sensor 26 output signal change $\hat{V}$ (t) was due to un-reacted urea. If, on the other hand, the sensor 26 produces a higher voltage V(t), not enough urea was being injected into the exhaust to reduce all of the $NO_x$ and the sensor output signal change $\hat{V}$ (t) was due to un-reacted NOx. Thus, if we reduce the amount of urea and the voltage V produced by the sensor reduces, (i.e., the direction of the change in urea is in the same direction in the change in the output signal, V(t), of the sensor) the sensor 26 is now known to be responding to urea. On the other hand, if we reduce the amount of urea and the voltage V(t) produced by the sensor increases, (i.e., the direction of the change in urea is in the opposite direction to change in the output signal, V(t), of the sensor) the sensor 26 is now known to be responding to NOx. FIG. 3 illustrates this effect.

The processor 12 (FIG. 1) is provided to detect the direction of the change in injected urea u(t) relative to the change in the output signal V(t) of the sensor 26. That is, the processor determines whether the direction of the change in output signal V(t) of the sensor 26 is the same as, or opposite to, the direction of the change in injected urea u(t). As described above, if they are the same direction, the sensor 26 is detecting urea whereas if the directions are opposite one another the sensor 26 is detecting NOx. Here such determination is made by multiplying a signal representative of $\hat{V}$ (t) (i.e., the change in the output signal V(t) produced by the sensor 28) with the change in the excitation signal û(t). Thus, the change in the output of the sensor, $\hat{V}$ (t), is proportional to the change in the output signal of the sensor V(t). Here, the determination in $\hat{V}$ (t) is made when the system is in a steady-state condition which can be checked by monitoring rate of change of rpm, load, space velocity, etc.

Thus, for time [t0−Tss, t0], we determine the steady-state output voltage,

Vss=

$$\int_{t0-Tss}^{t0} V(t)\,dt$$

Thus, during time from t0, to t0+D+Texc:

$\hat{V}(t) = V(t) - Vss,$

Where Vss is the steady state output voltage of the sensor 28 and where the excitation is repeated every Ttot seconds, where Ttot>D+Tss+Texc where, Tss is used to take into account the time used to determine Vss.

If the mathematical product of $\hat{V}$ (t) and û(t) is positive, the sensor 26 is determined by the processor 12 to be detecting urea. If, on the other hand, the mathematical product is negative, the sensor 26 is determined by the processor 12 to be detecting NOx. In FIG. 1, the multiplication is shown by a multiplier 41 which is fed $\hat{V}$ (t) produced by the high pass filter 47 (i.e., a signal proportional to the change in sensor output signal) and by a signal representative of the change in the urea excitation, i.e. û(t). It should be understood that the processor 12 is preferably a digital processor which performs the process shown in FIG. 4.

It should be noted that due to adsorption and desorption of urea in the catalyst 20 and reaction kinetics the time history profile of the voltage V(t) produced by the sensor 26 will not be a rapidly changing, pulse, but more a low pass filtered version of a pulse. Further, due to transport delay (i.e., the delay between the time the urea is injected into the exhaust 18 and the time the of reaction in the catalyst 20), the voltage V(t) produced by the sensor will be delayed an amount D from the commencement of the change in the injection of the urea. The delay D may be mapped a priori as a function of engine operating conditions, e.g., engine speed using a look-up table. Here, the output of the multiplier 41 is integrated in the processor 12 as represented by integrator 43. Thus, if the pulse-width of the change in the urea excitation signal û(t) has a pulse width Texc and starts at a time t0, the output of the integrator 43 may be represented as:

$$I = \left| \int_{t0}^{t0+D+Texc} \hat{V}(t+D) \hat{u}(t)\,dt \right|$$

Thus, if I>0, (i.e., if the integrated mathematical product of $\hat{V}$ (t) and û(t) is positive), the sensor 26 is detecting urea. Here, such condition is indicated by a logic 1 produced by comparator 44. Thus, here the amount of urea is V (t)*k_urea.

If, on the other hand, I<0 (i.e., the integrated mathematical product of $\hat{V}$ (t) and û(t) is negative), the sensor 26 is detecting $NO_x$. Here, such condition is indicated by a logic 1 produced by comparator 46. Thus, here the amount of NOx is V (t)*k_nox Having discriminated between sensing urea and sensing NOx, if I<0, the sensor 26 output signal V(t) can be fed to the transfer function shown by curves 32 or 34 in FIG. 2 and a measurement of the NOx may be obtained. If, one the other hand, I>0, the sensor 26 output signal V(t) can fed to the transfer function shown by curve 30 in FIG. 2 and a measurement of the urea may be obtained.

Here, as noted above, the excitation is repeated every Ttot seconds, where Ttot>D+Texc+Tss.

It should be noted that if I=0, the commanded change in urea was not applied and a diagnosis is that of a faulty injector. Here, such condition is indicated by a logic 1 produced by comparator 48.

If V>>0 (i.e., greater than some calibrate threshold), one may conclude that both the engine exhaust $NO_x$ and the urea are still measured after the catalyst 20 and one can conclude a faulty catalyst 20. Here, such condition is indicated by a logic 1 produced by comparator 50.

It should be noted that since here we decrease the amount of urea for a short time, an increase in tail pipe emissions may result. This is the case if I<0. This can be compensated by applying a positive correction+û after T0+T1+T2, when I<0. If I>0, too much urea is being injected and a positive correction is not required. This procedure keeps the overall tailpipe emissions neutral.

It should also be noted that the procedure works best in the steady state, when, as noted above, it is easy to determine $\hat{v}$(t), by subtracting the mean over the previous period. If knowledge of engine emissions and catalyst behavior is very accurate, the method may be applied to transients. In this case, it may be able to gain further information about the system catalyst conditions, urea injection system, and NOx sensor by measuring the transient sensor response.

Figure 4:
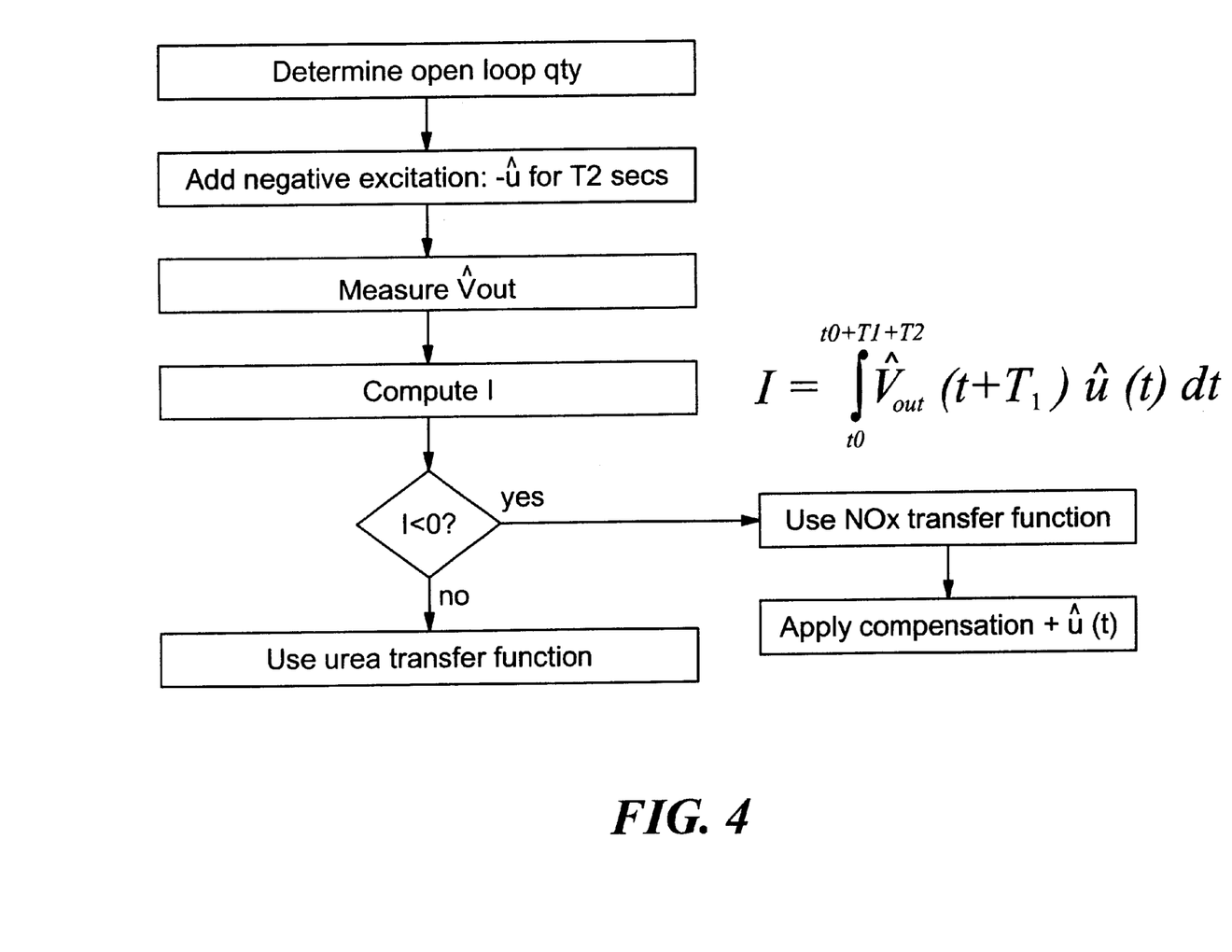
FIG. 4 is a flow diagram of the process used by the processor in FIG. 1 to determine the effectiveness of injected urea in reducing NOx produced by the engine exhaust in the system of FIG. 1.

Referring now to FIG. 4, the processor is programmed in accordance with the flow diagram shown therein. Thus, a determination is made as the open loop quantity of urea $u_0$ to be added. Next, a negative excitation signal is applied to the urea injector for T2 seconds. A measurement is made as to the change in the sensor 26 output signal. The signal I is computed as described above. If I<0, the NOx transfer function is used and a positive, increase, is made in the amount of urea. If, on the other hand, I<0, the urea transfer function is used.

Having described a method and system for determining whether the sensor 26 is responding to NOx or Urea, a method and system using these techniques will be described which controls the amount of urea to be injected into the engine exhaust to produce correct stoichiometric urea and diagnostics.

Figure 5:
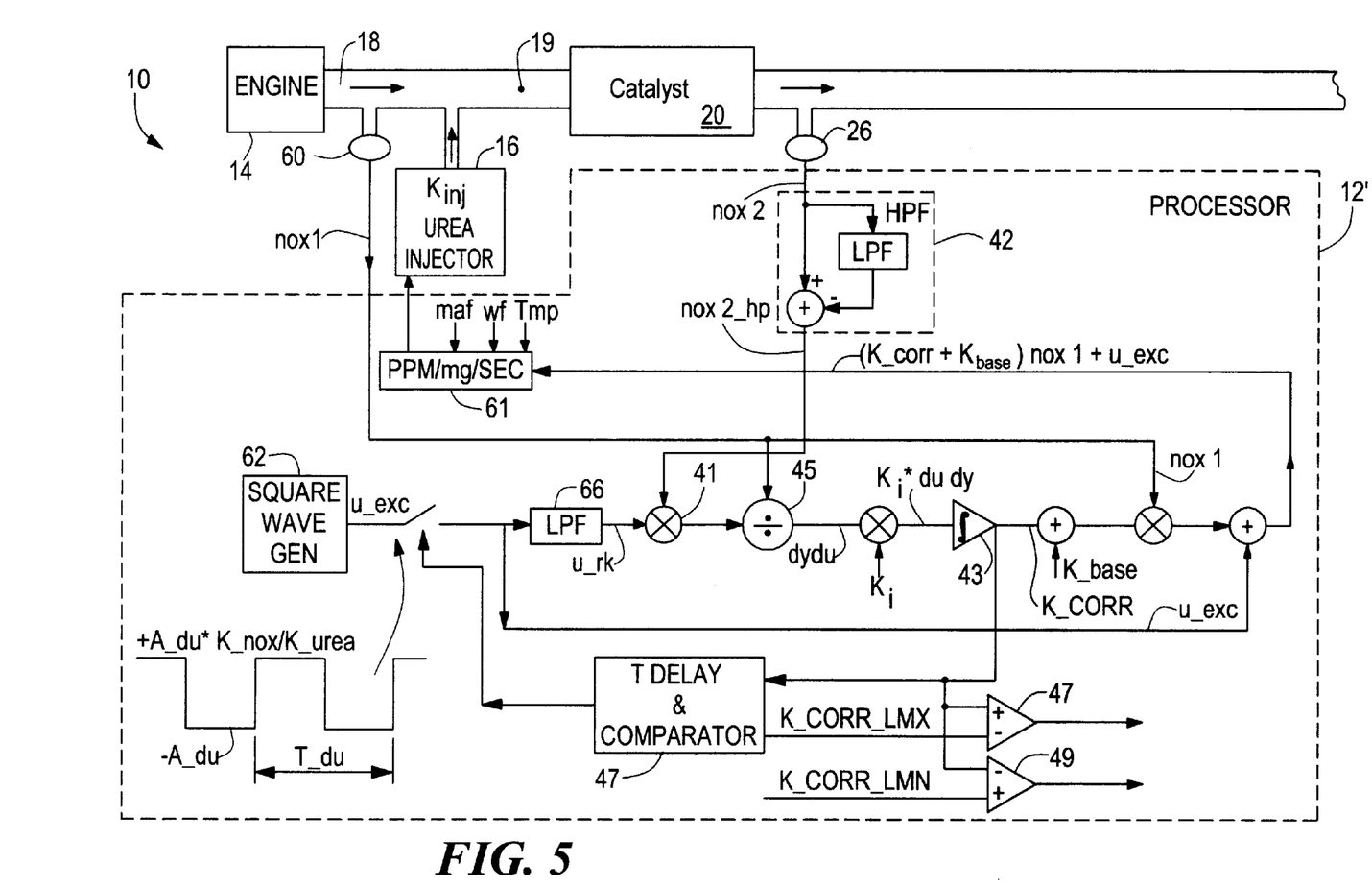
FIG. 5 is a functional block diagram of a NOx reduction system according to another embodiment of the invention.

Referring now to FIG. 5, a functional block diagram is shown of a NOx reduction system 10'. Here a NOx sensor 60 is included upstream of the point 19 where urea is added into the engine 14 exhaust 18 via injector 16. The NOx sensor 26 is disposed downstream of the catalyst 20, as shown. As noted above in connection with FIG. 1, the NOx sensors 26 and 60 are sensitive to both urea and NOx. The catalyst 20 is positioned between the point 19 where the urea is injected and the position of the NOx sensor 26. Output signals nox1, nox2 (where nox2 is referred to as V in connection with FIGS. 1–4) produced by sensors 60, 26 respectively are processed by a programmed processor 12', in a manner to be described, to produce the urea injection signal to urea injector 16. It is noted that part of the output nox2 is due to urea slip.

Here, the processor 12' is shown by a functional block diagram for purposes of understanding the signals processed by such processor 12'. It should be understood that preferably the processor 12' is a digital processor programmed to execute an algorithm to be described below. Suffice it to say here that the processor 40' includes a square wave generator 62 which produces an excitation voltage u_exc (where u_exc was referred to as û(t) in connection with FIGS. 1–4) which may be represented as:

$$u\_exc:=A\_du*k\_nox/k\_urea \text{ if } t<0.5*T\_du$$

$$u\_exc:=-A\_du \text{ if } t>0.5*T\_du;$$

where:
A_du is the amplitude of the negative portion of the steady state excitation signal fed to the urea injector 16 (i.e., a negative excitation signal reduces the amount of urea injected into the engine exhaust);
T_du is the period of the excitation signal u_exc; (T_du=Texc×2).
k_urea is the sensitivity of the NOx sensor 26 with respect to urea;
k_NOx is the sensitivity of the NOx sensor 26 with respect to NOx.

Thus, a correction factor k_nox/k_urea is inserted to account for different sensitivities of the sensor 26 to urea and NOx.

The output of the square wave generator 62 is fed, via a switch 64, to a low pass filter 66. The function of the low pass filter 66 is to take into account a reaction delay, D, between the time urea is injected into the exhaust and the reaction in the catalyst 20. The processor 40' provides this low pass filter 66 digitally in accordance with:

$$u\_rk:=kf\_rk*u\_rk+(1-kf\_rk)*u\_exc,$$

where:
u_rk is the output of the low pass filter 66;
kf_rk is time constant of NOx-urea reaction kinetics.

The output signal produced by the sensor 26 is here, as noted above, represented as: nox2. The signal nox2 is fed to a high pass filter 42 to produce an output signal nox2_hp representing the change in the output signal produced by the sensor 26. Here, the processor 40 provides this high pass filter output in accordance with:

$$nox2\_hp:=nox2-nox2\_lp; \text{ (where nox2\_hp was referred to as}$$

$\hat{v}$(t) in FIGS. 1–4).
where $nox2\_lp:=kf\_lp\_nox2*nox2\_lp+(1-kf\_lp\_nox2)nox2$;
where: kf_lp_nox2 is the filter gain for the low pass filter nox2.

The output of the high pass filter 42 (which represents the change in the output signal produced by the sensor 26) and the signal produced by the low pass filter 66 (which represents the change in the excitation signal u_exc to be fed to the urea injector 16, in a manner to be described, are fed to a multiplier 41. It should be noted that if the direction of change in the excitation signal u_rk is the same as the direction in the change in the sensor 26 signal, the mathematical product produced by the multiplier 41 will be positive. On the other hand, if the direction of change in the excitation signal u_rk is opposite to the direction in the change in the sensor 26 signal, the mathematical product produced by the multiplier 41 will be negative.

The mathematical product produced by the multiplier 41 is normalized by the signal nox1 produced by the sensor 60 in a divider 45 to produce:

$$dydu:=nox-hp*u\_rk/nox1$$

The signal dydu is scaled by ki and integrated by integrator 43 to produce a correction signal k_corr in accordance with:

$$k\_corr:=\int(ki*dydu) \, dt;$$

where: ki>0 is the integral gain used to correct the nominal urea:NOx ratio (which is k_base)

Thus, if dydu>0 (i.e., the change in the sensor 26 and the change in the urea excitation are the in the same direction), the amount of urea should be reduced whereas, if dydu<0, (i.e., the change in the sensor 26 and the change in the urea excitation are the in opposite directions),the amount of urea should be increased.

The signal k_corr is used to add (if k_corr>0) or subtract from (if k_corr<0) the nominal a priori determined amount of urea for correct stoichiometry which is k_base*nox1.

The actual amount of urea added by the injector is k_base*nox1*k_injector, where k_injector is the injector transfer function which is unknown because of aging, etc. Thus, with the processor 40, the signal k_corr together with u_exc will both modulate the signal k_base*nox1 to produce the correct stoichiometric urea independent of k_injector and thus automatically adjust the amount of urea which should be added to the exhaust.

More particularly, the final urea quantity to be applied via the injector 16 is:

$$u\_tot\_ppm := (k\_base + k\_corr) * nox1 + u\_exc;$$

where k_base is the nominal urea:NOx ratio.

To put it another way, a priori determined injection signal $u_0$=nox1*k_base is modulated by both the correction signal k_corr*nox1 and the square wave signal u_exc. At correct stoichiometry, (k_corr+k_base)*k_injector*nox1 results in the injector 16 delivering stoichiometric urea to the engine exhaust upstream of the catalyst 20.

The signal u_tot_ppm is in parts per million of urea and is converted to mg/sec of urea by using mass air flow (Maf) of the exhaust, the upstream temperature (TMP) of the catalyst and the fuel flow (Wf) in a converter 61.

At the end of each period T_du, the integral int_dydu_last is evaluated in a comparator 47 as follows:

$$\int_{t-T\_du}^{t} dy\,du(t)\,dt$$

between the limits t−T_du and t, where t is the current time. The integral represents the incremental correction to the urea:NOx ratio accumulated over the last excitation period T_du. If int_dydu_last<k_dydu_thres, (where k_dydu_thres is the threshold for correction contribution to determine whether further adjustment is needed), this incremental correction is considered small enough to terminate adjusting the urea and the switch 64 is open from its initial closed condition. Otherwise, the switch 64 remains closed.

If k_corr>k_corr_lmx, where k_corr_lmx is the maximum limit for the correction factor k_corr to be declared a failure, (i.e., a blocked injector 16 or a catalyst 20 failure) as determined by comparator 47, a system failure has occurred (i.e., the catalyst 20 is inactive or the injector 16 is blocked).

If k_corr<k_corr_lmn<0, where k_corr_mn is the minimum limit for the correction factor k_corr to declare a system failure for a leaking urea injector, as determined by comparator 49, a system failure has occurred, i.e., the injector is leaking, and excess urea will shorten the life of the exhaust system. For example, for detection of a 50 percent increase, k_corr_lmx is set=0.5.

Figure 6:
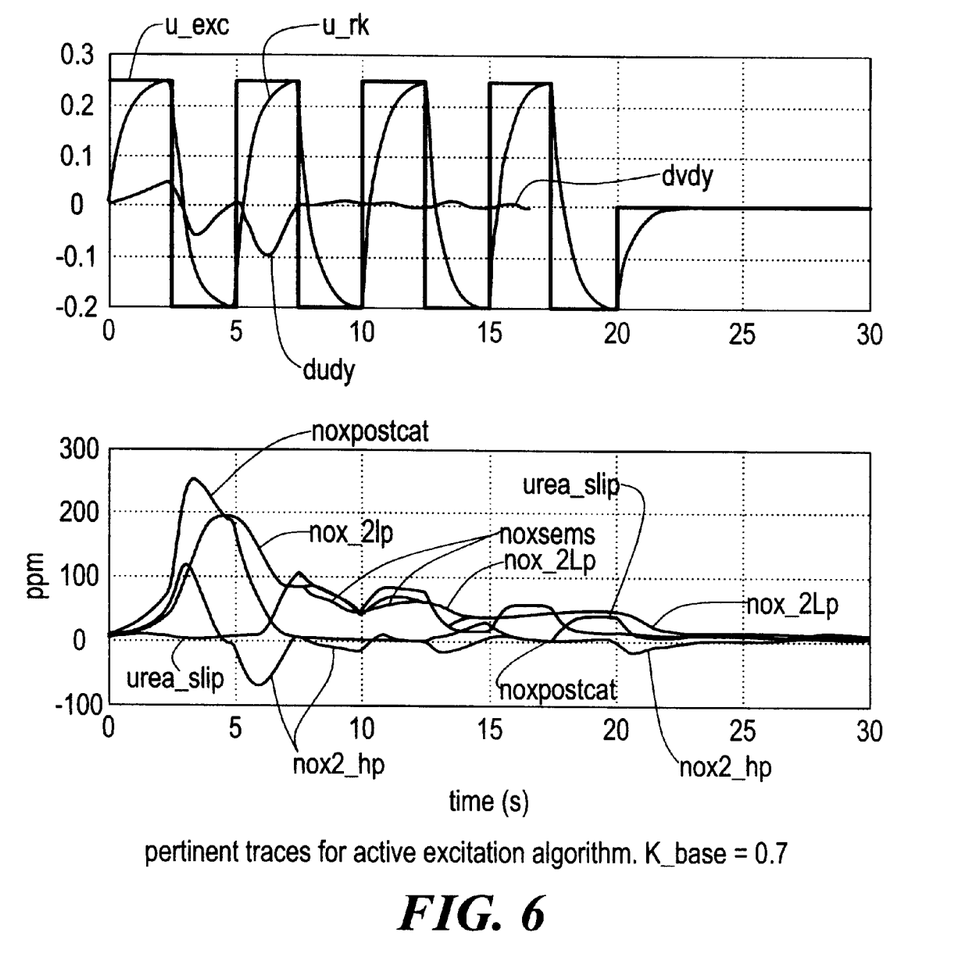
FIG. 6 are diagrams showing as a result of computer simulations various parameters produced in the system of FIG. 5 for an assumed Urea to NOx ratio correction factor of +0.32.
Figure 7:
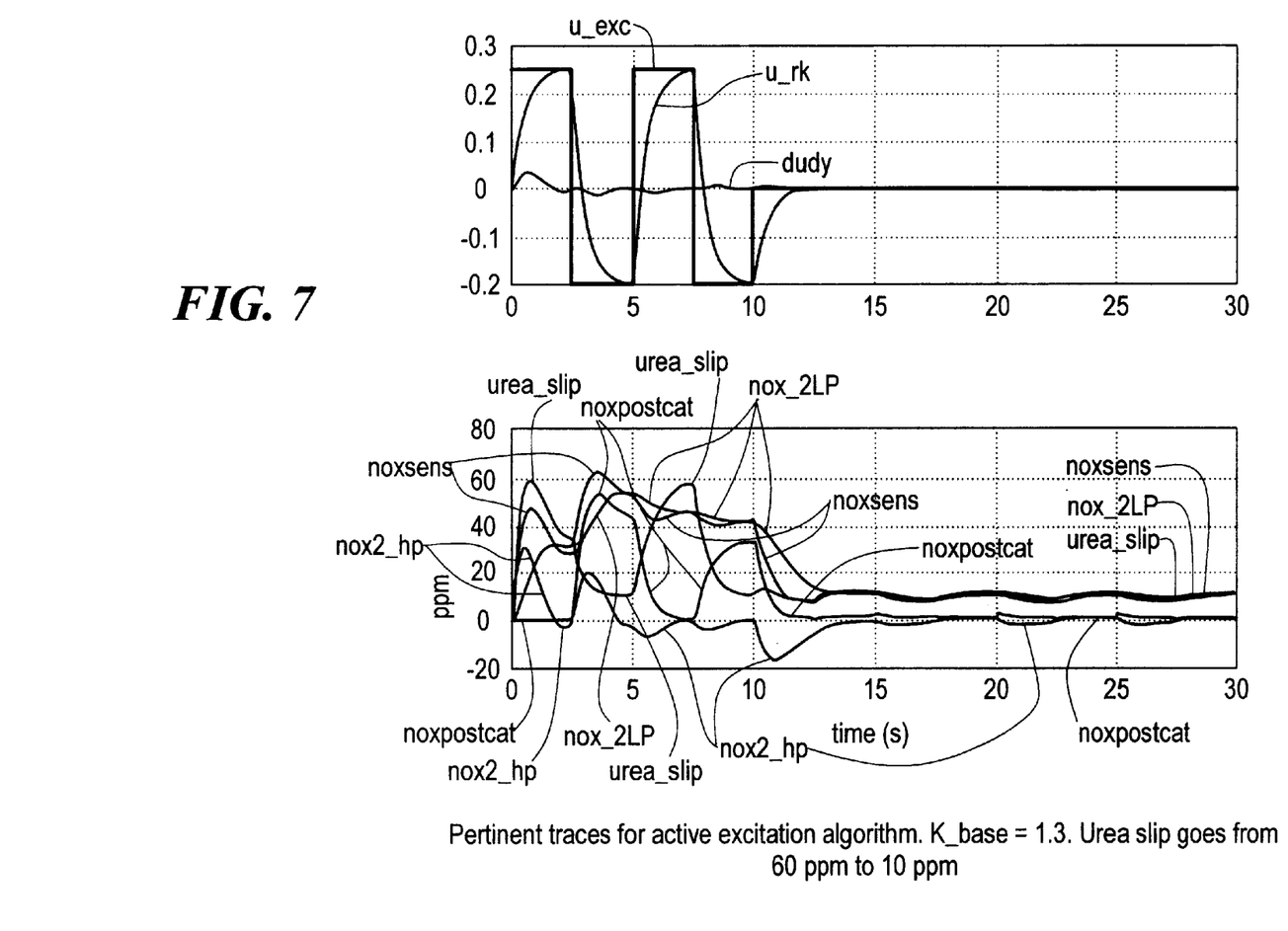
FIG. 7 are diagrams showing as a result of computer simulations various parameters produced in the system of FIG. 5 for an assumed Urea to NOx ratio correction factor of 0.3.

Referring now to FIG. 6, such FIG. 6 shows, as a result of computer simulations various parameters produced in the system of FIG. 5 for a resulting Urea to NOx ratio correction factor of +0.32 (i.e., k_base=0.68) FIG. 7 shows, as a result of computer simulations various parameters produced in the system of FIG. 5 for a resulting Urea to NOx ratio correction factor of −0.3 (i.e., k_base=1.3).

The process described above in connection with FIG. 5 may be summarized as follows:

The following measured inputs are used:

Nox1: Nox sensor signal measured before the SCR brick (in ppm)

Nox2: Nox sensor signal measured after the SCR brick (part of this output is due to urea slip) (in ppm)

MAF: mass air flow

T1: temperature upstream of the SCR brick

Wf: fuel flow (Maf, T1 and Wf are used to convert the urea ppm quantity to a quantity in mg/sec.)

The following gains are used and to be calibrated based on experimental data. They may dependent on engine operating conditions (speed and load) and exhaust temperature.

A_du: the amplitude of the negative part of the excitation

T_du: the period of the excitation is T_du k_urea: sensitivity of the Nox sensor wrt urea k_nox: sensitivity of the Nox sensor wrt urea (A_du, k_urea and k_nox determine the amplitude of the positive part of the excitation).

kf_lp_nox2: filter gain for low pass filtered nox2.

kf_rk: time constant of nox-urea reaction kinetics.

k_base: nominal urea:nox ratio ki: integral gain to correct the nominal urea:nox ratio k_dydu_thres: threshold for correction contribution to determine whether further adjustment is needed.

k_corr_lmx: maximum limit for correction factor to declare an OBD failure (blocked injector or catalyst malfunction).

k_corr_lmn: minimum limit for correction factor to declare a system failure (leaking injector).

As noted above, the processor 12' is a digital processor. The following flow diagram describes the program executed by such digital processor:

THE PROCESS FLOW

Step 1 The excitation signal is the repetitive signal with period T_du defined by:

$$u\_exc := A\_du * k\_nox / k\_urea \text{ if } t < 0.5 * T\_du$$

$$u\_exc := -A\_du \text{ if } t > 0.5 * T\_du$$

The correction factor k_nox/k_urea is inserted to account for different sensitivities to Nox and urea. These gains follow from sensor characteristics.

Step 2 Compute the switch on_logic (specified later).

Step 3 If on_logic==TRUE, apply u_exc, otherwise don't and return to 1.

Step 4 Compute the excitation signal delayed by reaction kinetics: u_rk:=kf_rk*u_rk+(1−kf_rk)*u_exc.

Step 5 Obtain the measurement voltage from the second Nox sensor, nox2.

Step 6 Compute the low pass filtered version nox2_lp, with filter constant kf_lp_nox2:

$$nox2\_lp := kf\_lp\_nox2 * nox2\_lp + (1-kf\_lp\_nox2) * nox2.$$

Step 7 Compute the high pass filtered nox2_hp:=nox2−nox2_lp.

Step 8 Obtain the measurement voltage from the first Nox sensor: nox1.

Step 9 Compute the convolution: dydu:=nox2_hp*u_rk/nox1

Step 10 Integrate the convolution into a correction factor: k_corr:=k_corr+ki*dydu Step 11 At the end of every period T_du evaluate the integral int_dydu_last:=kiEAUATION dydu(t) dt between the limits t−T_du and t, where t is the current time. This integral represents the incremental correction to the urea:nox ratio accumulated over the last excitation period. If int_dydu_last<k_dydu_thres, this incremental correction is small enough to stop adjusting, and set on_logic=false. Otherwise on_logic is true.

Step 11 If $$k\_corr > k\_corr\_lmx$$

a system failure has occurred: the catalyst is inactive or the injection system is blocked.

If $$k\_corr < k\_corr\_lmn$$

a system failure has occurred: the injection system is leaking. The limit k_corr_lmx corresponds directly to OBD limits. For detection of a 50% increase in a regulated exhaust component, set k_corr_lmx=0.5.

Step 12 The final urea quantity to be applied is: u_tot_ppm:=(k_base+k_corr)*nox1+u_exc.

Step 13 Use MAF, Wf, T1 to convert u_tot_ppm to a quantity in mg/sec: u_tot_mgsec.

Step 14 Go to Step 1.

A number of embodiments of the invention have been described. Nevertheit will be understood that various modifications may be made without departing from the spirit and scope of the invention. Accordingly, other embodiments are within the scope of the following claims.

What is claimed is:

1. A method for controlling an amount of a first substance to be added to a reaction with at least a second substance in the reaction, such method being used to reduce one of the second substance in the reaction, the product of such reaction along with un-reacted portions of the substances being directed to a sensor, such sensor producing an output signal in response to detection of un-reacted portions of the first and un-reacted portions of the second substance, such method comprising:
    (a) changing the amount of the first substance added to the reaction;
    (b) measuring whether the output signal increases or decreases with the changed amount of the first substance;
    (c) determining from the measurement whether the sensor is responding to the un-reacted portions of the first substance or to the un-reacted portions of the second substance; and
    (d) adjusting the amount of the first substance to the reaction in accordance with the determination.

2. A method for controlling an amount of a reactant used to reduce a substance, such reactant being added to such substance to react with such substance, the product of such reaction along with un-reacted portions of the substance and un-reacted portions of the reactant being directed to a sensor, such sensor producing an output signal in response to detection of both the un-reacted portions substance and the un-reacted portions of the reactant, such method comprising:
    (a) changing the amount of reactant added to the substance;
    (b) measuring whether the output signal increases or decreases with the changed amount of reactant;
    (c) determining from the measurement whether the sensor is responding to the un-reacted reactant or to the un-reacted substance; and
    (d) adjusting the amount of the reactant added to the substance in accordance with the determination.

3. A method for controlling an amount of a reactant used to reduce a substance, such reactant being added to such substance to react with such substance, the product of such reaction along with un-reacted portions of the substance and un-reacted portions of the reactant being directed to a sensor, such sensor producing an output signal in response to detection of both the un-reacted portions substance and the un-reacted portions of the reactant, such method comprising:
    (a) periodically increasing and decreasing the amount of reactant added into the substance;
    (b) measuring changes in the output signal produced by the sensor from such periodical increases and decreases; and
    (c) integrating over each period a mathematical product of the periodically increasing and decreasing the amount of reactant with the measured change in output signal to produce a control signal, and
    (d) adjusting the amount of the reactant added to the substance in accordance with the control signal.

4. A processor for controlling the addition of a reactant to a substance, such reactant being added to react with such substance, the product of such reaction along with un-reacted portions of the substance and un-reacted portions of the reactant being directed to a sensor, such sensor producing an output signal in response to detection of both the un-reacted portions of the substance and the un-reacted portions of the reactant, such processor changing the amount of reactant added into the substance; such processor being programmed to: determine whether the change in the amount of reactant and the change the output signal are in the same direction or in opposite directions.

5. A processor for controlling reduction of a substance with a reactant, such reactant being added to the substance to react with such substance, the product of such reaction along with un-reacted portions of the substance and un-reacted portions of the reactant being directed to a sensor, such sensor producing an output signal in response to detection of both the un-reacted portions of the substance and the un-reacted portions of the reactant, such processor being programmed to:
    (a) change the amount of reactant added to the substance;
    (b) determine whether the output signal increases or decreases with the changed amount of reactant; and
    (c) determine from the measurement whether the sensor is responding to the un-reacted reactant or to the un-reacted substance.

6. A processor for controlling an amount of a reactant used to reduce a substance added to such substance to react with such substance, the product of such reaction along with un-reacted portions of the substance and un-reacted portions of the reactant being directed to a sensor, such sensor producing an output signal in response to detection of both the un-reacted portions substance and the un-reacted portions of the reactant, such processor being programmed to:
    (a) periodically increase and decrease the amount of reactant added to the substance;
    (b) measure changes in the output signal produced by the sensor from such periodical increases and decreases;
    (c) integrate over each period a mathematical product of the periodically increasing and decreasing the amount of reactant with the measured change in output signal to produce a control signal, and
    (d) adjust the amount of the reactant added to the substance in accordance with the control signal.

* * * * *